(12) United States Patent
Nourollah (10) Patent No.: US 9,616,999 B1
(45) Date of Patent: Apr. 11, 2017

(54) ROTATING WING

(71) Applicant: Mahmoud Nourollah, Oshkosh, WI (US)

(72) Inventor: Mahmoud Nourollah, Oshkosh, WI (US)

(*) Notice: Subject to any disclaimer, the term of this patent is extended or adjusted under 35 U.S.C. 154(b) by 0 days.

(21) Appl. No.: 15/274,266

(22) Filed: Sep. 23, 2016

(51) Int. Cl.
*B64C 39/02* (2006.01)
*B64C 29/02* (2006.01)

(52) U.S. Cl.
CPC ............ *B64C 39/026* (2013.01); *B64C 29/02* (2013.01)

(58) Field of Classification Search
CPC .............................. B64C 39/026; B64C 29/02
USPC ......................................................... 244/4 A
See application file for complete search history.

(56) References Cited

U.S. PATENT DOCUMENTS

| | | | | |
|---|---|---|---|---|
| 1,284,851 A * | 11/1918 | Ashworth | ............. | B64C 39/005 244/20 |
| 2,669,309 A * | 2/1954 | Akre | ........................ | B63H 1/08 416/111 |
| 9,394,049 B1 * | 7/2016 | Nourollah | ............... | B64C 27/00 |
| 2002/0003188 A1 * | 1/2002 | Moshier | ................ | B64C 39/026 244/4 R |
| 2005/0098682 A1 * | 5/2005 | Pai | .......................... | B64C 27/10 244/17.11 |
| 2006/0151664 A1 * | 7/2006 | Yu | .......................... | B63H 13/00 244/4 R |
| 2012/0298790 A1 * | 11/2012 | Bitar | ...................... | B64C 27/12 244/17.11 |
| 2014/0219784 A1 * | 8/2014 | Nourollah | ............. | B64C 39/008 415/122.1 |

* cited by examiner

*Primary Examiner* — Timothy D Collins
*Assistant Examiner* — Keith L Dixon
(74) *Attorney, Agent, or Firm* — Donald J. Ersler (57) ABSTRACT

A rotating wing includes a support frame, two connecting rods, two drive systems and a wing frame. The support frame includes a first side frame, a second side frame, a cross frame member, a first guide pin and a second guide pin. The cross frame member is secured to one end of the first and second side frames. A first connecting rod is rotatably retained on the first side frame. A second connecting rod is rotatably retained on the second side frame. The first guide pin extends from the first side frame and the second guide pin extends from the second side frame. The wing frame includes first and second side members. A peripheral groove is formed in an outer surface of the first and second side members to receive the first and second guide pins. First and second drive systems rotate the first and second connecting rods.

20 Claims, 7 Drawing Sheets

ROTATING WING

BACKGROUND OF THE INVENTION

1. Field of the Invention

The present invention relates generally to flying and more specifically to a rotating wing, which is capable of lifting and/or propelling a person, an aircraft or an object, such as a helicopter, an airplane or package, through the air.

2. Discussion of the Prior Art

Today, there are numerous vertical take-off and propulsion mechanisms. Some are relatively small and are designed to be strapped onto a person's back while others are larger and can be used to power an aircraft, such as a helicopter or an airplane. A small power pack used to lift a person is sometimes referred to as a jetpack. Jetpacks usually include some kind of motor or engine, which can utilize air velocity or water velocity to lift and propel a person through the air. Some propulsion mechanisms can utilize a power driven shaft with radiating blades, propellers, vanes, wings, etc. placed so as to thrust air or water in a desired direction when spinning to generate sufficient force to lift and propel a person through the air. Some of these devices operate on fossil fuels, such as hydrogen, gasoline, propane or high octane jet fuel, while others rely on electrical batteries. Regardless of the different designs, there is constant effort by engineers to create a more efficient propulsion mechanism.

Accordingly, there is a clearly felt need in the art for a rotating wing, which can generate sufficient lift and mobility to propel a person, aircraft or object, such as a helicopter, an airplane or package, through the air in an efficient and cost effective manner.

SUMMARY OF THE INVENTION

This invention relates to a rotating wing, which is capable of lifting and propelling an object. The rotating wing preferably includes a support frame, a pair of connecting rods, a pair of drive systems and a wing frame. The support frame includes a first side frame, a second side frame, a cross frame member, a first guide pin and a second guide pin. One end of the first and second side frames are secured to opposing ends of the cross tube. A motor with drive shafts extending from opposing ends is preferably retained in an inner perimeter of the cross frame member. Substantially a middle of a first connecting rod is rotatably retained on an opposing end of the first side frame. The first guide pin extends inward from the first side frame, adjacent the cross tube. Substantially a middle of a second connecting rod is rotatably retained on an opposing end of the second side frame. The second guide pin extends inward from the second side frame, adjacent the cross tube.

The wing frame preferably includes a first side member, a second side member, at least one cross member and a wing cover. The first side member is formed on or attached to a first end of the at least one cross member and the second side member is attached to a second end of the at least one cross member. The wing cover is secured to the first and second side members and/or the at least one cross member. A middle of the first and second side members are rotatably retained by one end of the first and second connecting rods. A counterweight equal to substantially one half of a weight of the wing frame is attached to an opposing end of each connecting rod. An oval groove or substantially hour glass groove is formed in an outer surface of the first and second side frame members to receive first and second guide pins.

The pair of drive system includes a first drive system and a second drive system. Each drive system includes a drive gear and a driven gear; or two pulleys and a drive belt. A first drive gear or a first drive pulley is attached to a first drive shaft of a motor. A second drive gear or a second drive pulley is attached to a second motor shaft of the motor. A first driven gear or a first driven pulley is attached to a first drive axle of the first connecting rod. A second driven gear or a second driven pulley is attached to a second drive axle of the second connecting rod. A first drive belt is attached to the first drive pulley and the first driven pulley. A second drive belt is attached to the second drive pulley and the second driven pulley. However, the first and second drive axles may be replaced by first and second drive shafts of first and second motors. The first and second motors are secured to the first and second side frames, respectively. A power source, such as a battery is used to supply electrical power to the at least one motor. Additionally, an internal combustion engine may be used to electrically charge a battery or directly drive the first and second connecting rods.

In use, the first and second connecting rods are rotated by the at least one motor. Rotation of the first and second connecting rods cause the wing frame to have an oval or hour glass motion as defined by the oval groove or substantially hour glass groove mating with the first and second guide pins. The rotation of the wing frame will cause lift to be developed.

Accordingly, it is an object of the present invention to provide a rotating wing, which can generate sufficient lift and mobility to propel a person, aircraft or object, such as a helicopter, an airplane or package, through the air in an efficient and cost effective manner.

DETAILED DESCRIPTION OF THE PREFERRED EMBODIMENTS

Figure 2:
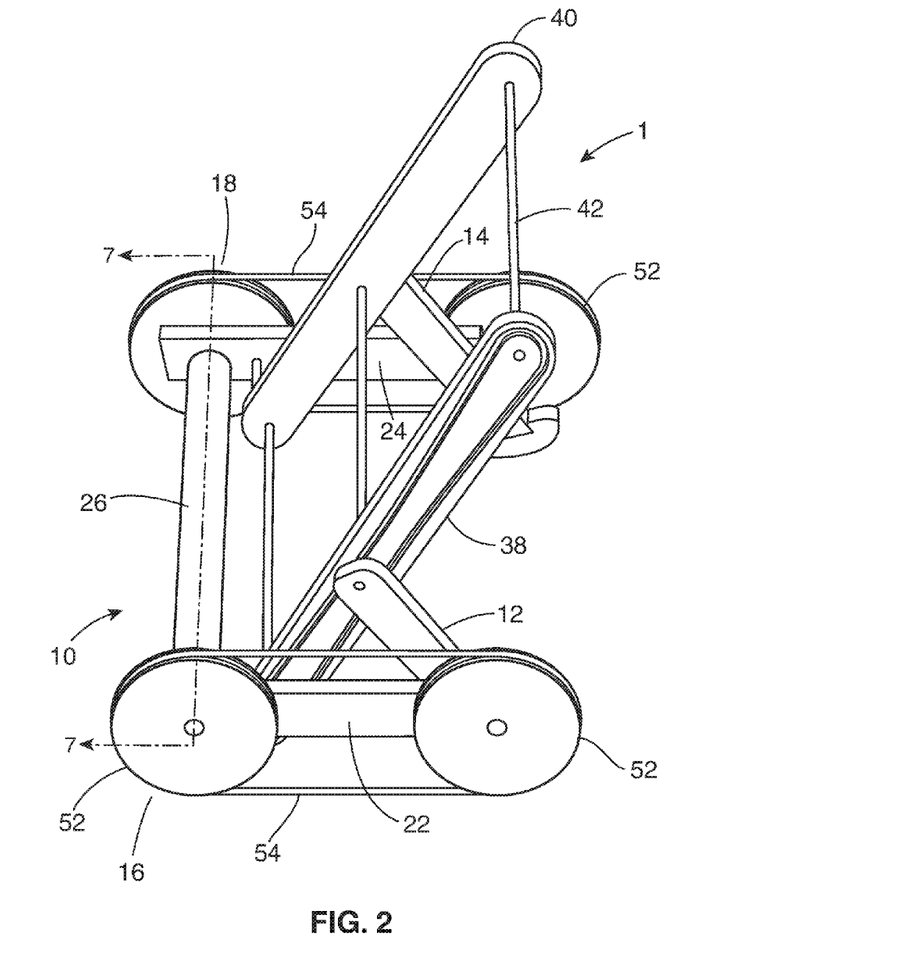
FIG. 2 is a side perspective view of a rotating wing in accordance with the present invention.
Figure 3:
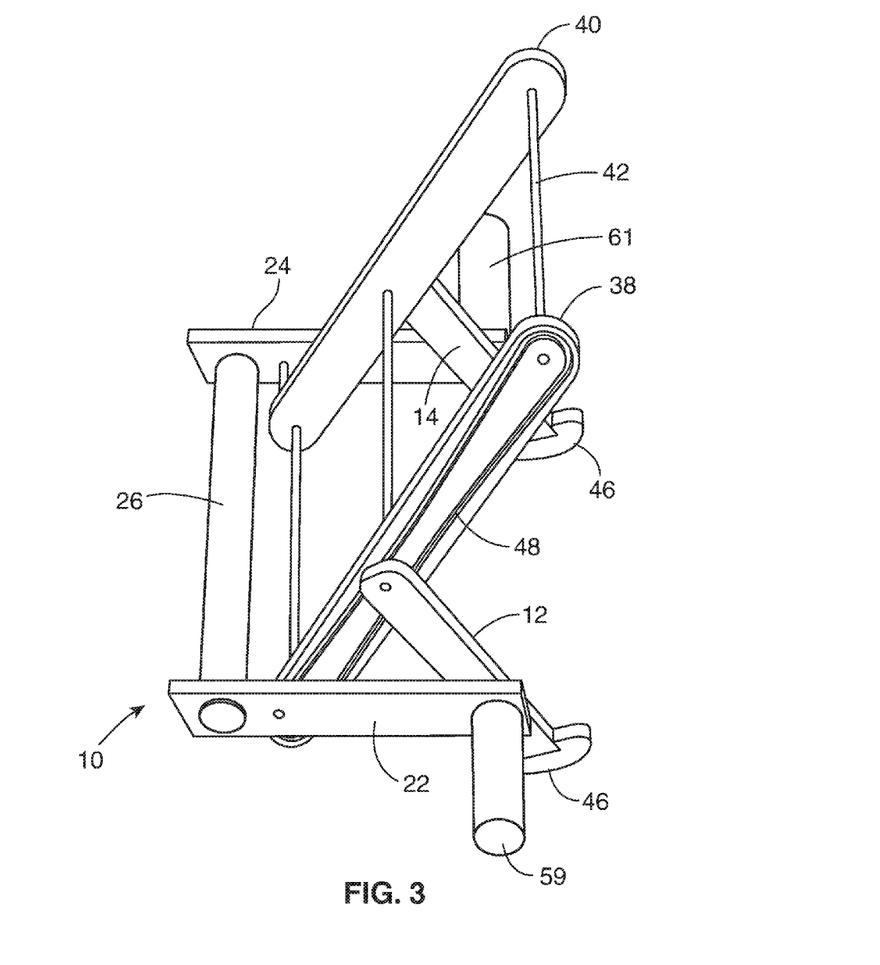
FIG. 3 is a side perspective view of a rotating wing with two motors for drive systems in accordance with the present invention.
Figure 4:
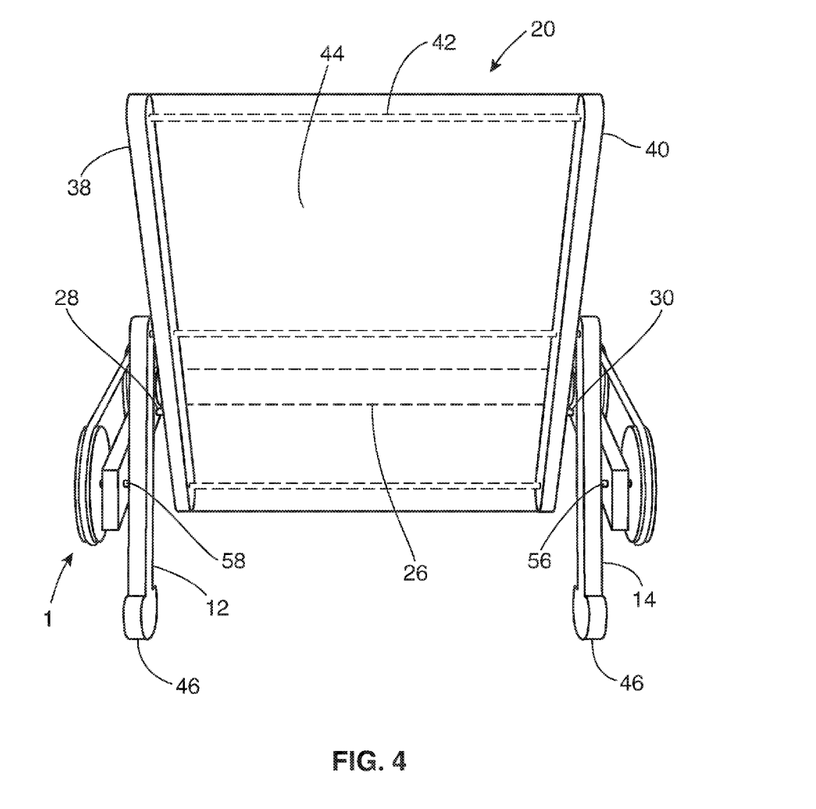
FIG. 4 is a rear perspective view of a rotating wing in accordance with the present invention.
Figure 5:
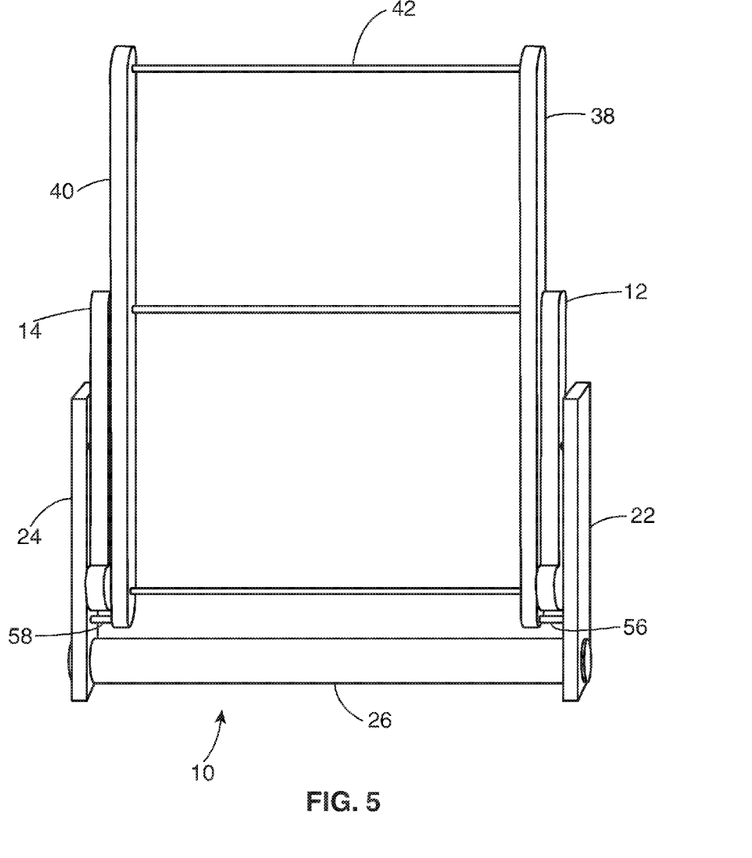
FIG. 5 is a front perspective view of a rotating wing without drive systems in accordance with the present invention.
Figure 6:
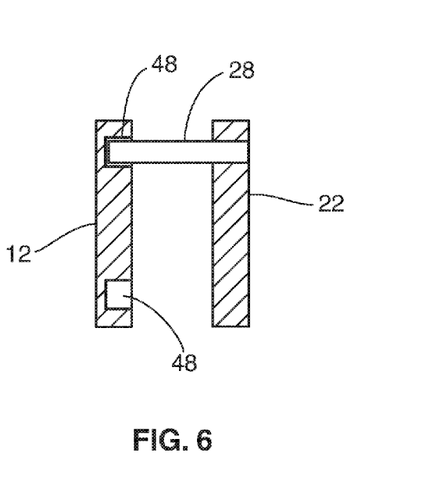
FIG. 6 is a cross sectional view of a rotating wing cut through FIG. 1 in accordance with the present invention.
Figure 7:
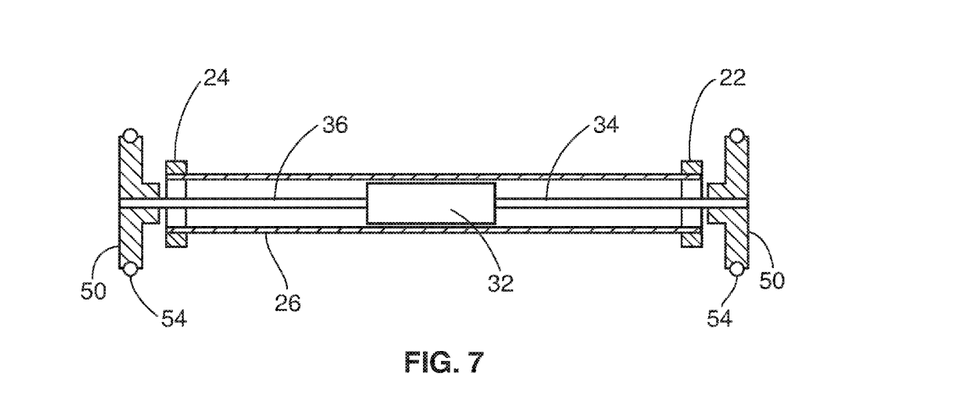
FIG. 7 is a cross sectional view of a cross frame member with a motor retained in an inner perimeter and the motor having drive shafts extending from opposing ends in accordance with the present invention.

With reference now to the drawings, and particularly to FIG. 2, there is shown a side perspective view of a rotating wing 1. With reference to FIGS. 1 and 3-5, the rotating wing 1 preferably includes a support frame 10, a pair of connecting rods 12, 14, a first drive system 16, a second drive system 18 and a wing frame 20. The support frame 10 includes a first side frame 22, a second side frame 24, a cross frame member 26, a first guide pin 28 and a second guide pin 30. One end of the first and second side frames 22, 24 are attached to opposing ends of the cross frame member 26. With reference to FIG. 6, a motor 32 includes a first drive shaft 34 and a second drive shaft 36 extending from opposing ends. The motor 32 is preferably retained in an inner perimeter of the cross frame member 26. Substantially a middle of a first connecting rod 12 is rotatably retained on an opposing end of the first side frame 22. The first guide pin 28 extends inward from the first side frame 22, adjacent the cross frame member 26 and the second guide pin 30 extends inward from the second side frame 24, adjacent the cross frame member 26. Substantially a middle of a second connecting rod 14 is rotatably retained on an opposing end of the second side frame 24.

The wing frame 20 includes a first side member 38, a second side member 40, at least one cross member 42 and a wing cover 44. The first side member 38 is attached to a first end of the at least one cross member 42 and the second side member 40 is attached to a second end of the at least one cross member 42. A middle of the first and second side members 38, 40 are rotatably retained by one end of the first and second connecting rods 12, 14, respectively. The wing cover is wrapped around a perimeter of the first and second side members 38, 40 and/or the at least one cross member 42. A counterweight 46 equal to substantially one half of a weight of the wing frame 20 is formed on or attached to an opposing end of each connecting rod 12, 14. A peripheral groove may have a substantially hour glass shape 48, an oval shape 49 or any other suitable shape. The first hour glass groove 48 is formed in an outer surface of the first side member 38 to receive the first guide pin 28 and a second hour glass groove (not shown) is formed in an outer surface of the second side member 40 to receive the second guide pin 30. However, the wing frame may be fabricated from a single molded part with the peripheral grooves formed in opposing sides of the wing frame 20. The wing frame would include first side, a second side and a wing surface.

Figure 1:
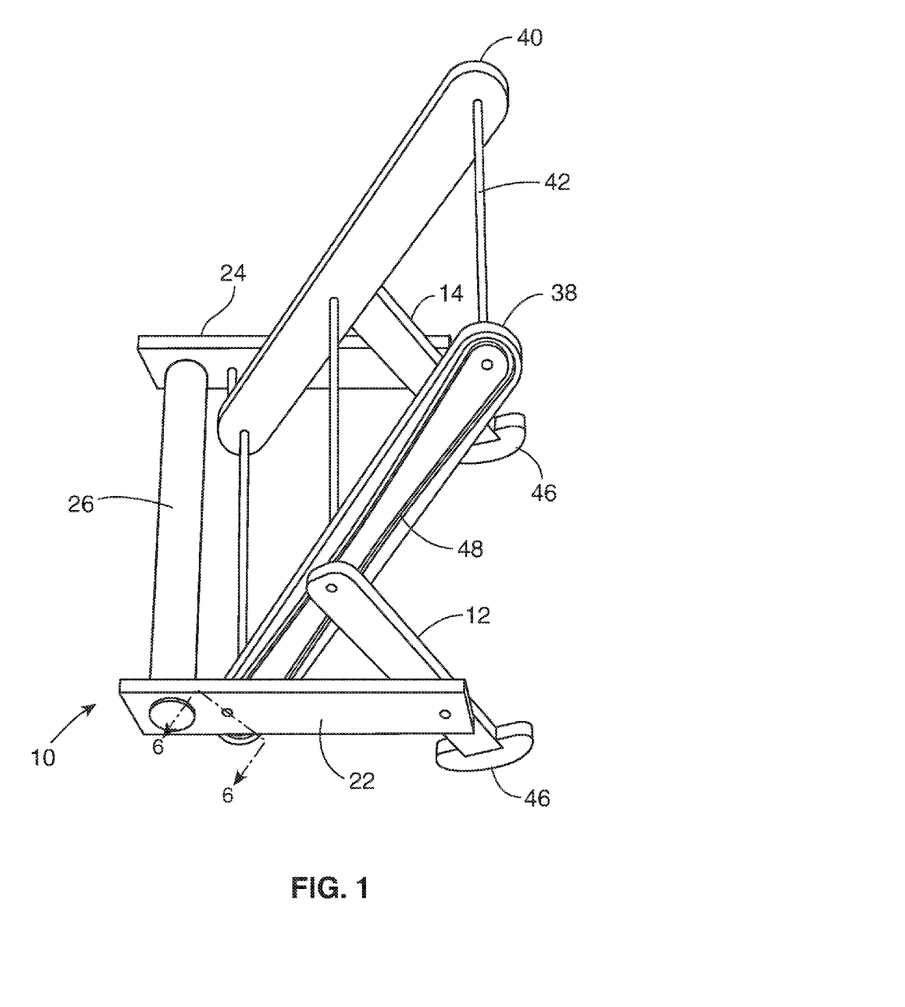
FIG. 1 is a side perspective view of a rotating wing with an hour glass groove and without drive systems in accordance with the present invention.
Figure 1A:
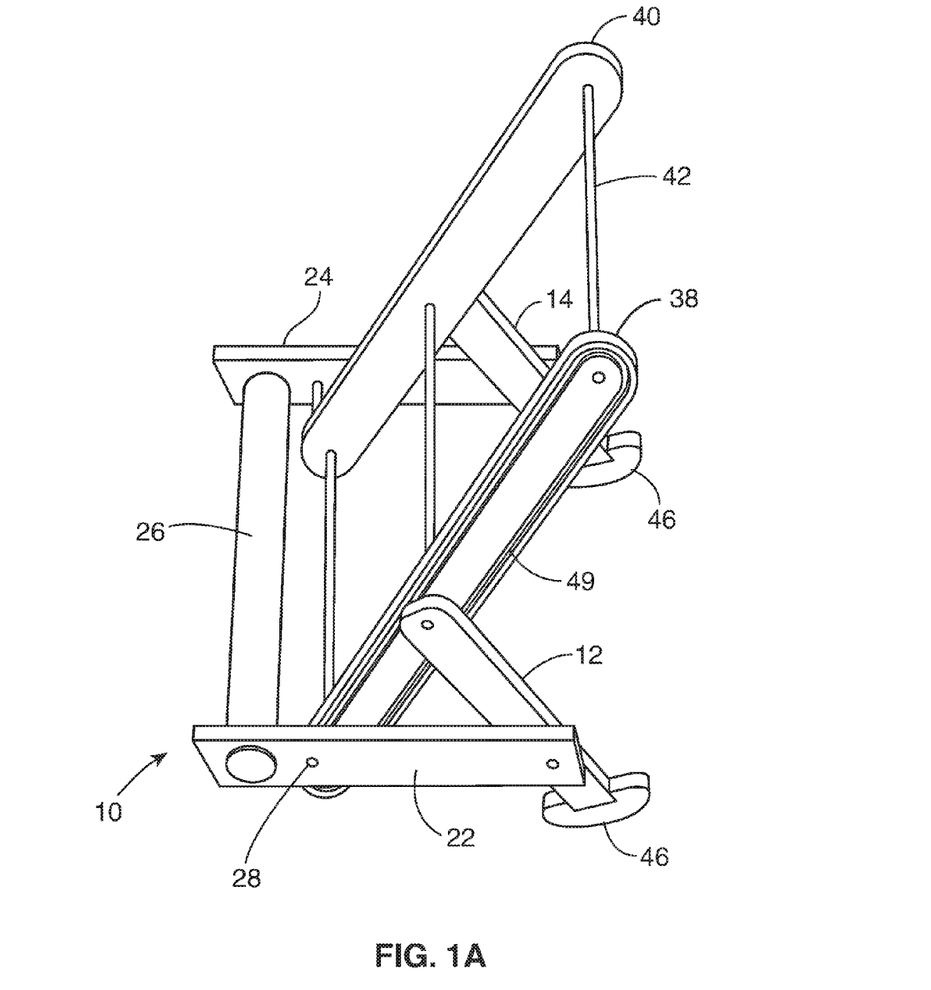
FIG. 1*a* is a side perspective view of a rotating wing with an oval groove and without drive systems in accordance with the present invention.

The first drive system 16 includes a drive pulley 50, a driven pulley 52 and a drive belt 54. The second drive system 18 includes the drive pulley 50, the driven pulley 52 and the drive belt 54. The drive pulley 50 is attached to the first and second drive shafts 34, 36. The driven pulley 52 is attached to a first drive axle 56 of the first connecting rod 12 and a second drive axle 58 of the second connecting rod 14. A drive gear and a driven gear could be substituted for the drive pulley 50, the driven pulley 52 and the belt 54. With reference to FIG. 1a, a first motor 59 is used to directly rotate the first connecting rod 12 and a second motor 61 may is used to directly rotate the second connecting rod 14. A drive belt 54 is attached to the first drive pulley 50 and the first driven pulley 52. A second drive belt 54 is attached to the second drive pulley 50 and the second driven pulley 52. However, a single motor 32, 59 or 61 may be used to rotate only one of the connecting rods 12, 14.

A power source, such as a battery (not shown) is used to supply electrical power to the at least one motor 32, 59, 61. Additionally, an internal combustion engine may be used to electrically charge a battery or directly drive the first and second connecting rods 12. 14.

In use, the first and second connecting rods 12, 14 are rotated by the at least one motor, 32, 59, 61. Rotation of the first and second connecting rods 12, 14 cause the wing frame 20 to have a rotation as defined by the hour glass groove 48 or the oval groove 49 mating with the first and second guide pins 56, 58. The rotation of the wing frame 20 will cause lift to be developed.

The rotating wing may also be used inside an enclosed chamber as a piston to create a vacuum cleaner, an air pump, a vacuum pump, an internal combustion engine or the like.

While the invention has been described in conjunction with two specific embodiments, it is to be understood that many alternatives, modifications and variations will be apparent to those skilled in the art in light of the foregoing description. Accordingly, this invention is intended to embrace all such alternatives, modifications and variations, which fall within the spirit and scope of the appended claims.

I claim:

1. A rotating wing for transporting an object, comprising:
   a support frame includes a first side frame, a second side frame and a cross frame member;
   a first connecting rod is rotatably retained on said first side frame;
   a second connecting rod is rotatably retained on said second side frame;
   a wing frame includes a first side, a second side and a wing surface, a first peripheral groove is formed in an outer surface of said first side, a second peripheral groove is formed in an outer surface of said second side;
   a first guide pin extends from said first side frame, said first guide pin engages said first peripheral groove, a second guide pin extends from said second side frame, said second guide pin engages said second peripheral groove; and
   at least one motor rotates at least one of said first and second connecting rods.

2. The rotating wing for transporting an object of claim 1 wherein:
   said at least one motor is a first motor retained on said first side frame and a second motor retained on said second side frame, said first motor rotates said first connecting rod, said second motor rotates said second connecting rod.

3. The rotating wing for transporting an object of claim 1 wherein:
   said at least one motor is a doubled ended motor having a first drive shaft extending from a first end and a second motor extending from a second end, said doubled ended motor is retained inside said cross member.

4. The rotating wing for transporting an object of claim 3 wherein:
   a first drive pulley is attached to said first drive shaft, a second drive pulley is attached to said second drive shaft, said first drive pulley rotates said first connecting rod through a first driven pulley and a first drive belt, said second drive pulley rotates said second connecting rod through a second driven pulley and a second drive belt.

5. The rotating wing for transporting an object of claim 1 wherein:
   said peripheral groove has the shape of one of an oval and an hour glass.

6. The rotating wing for transporting an object of claim 1 wherein:
   at least one cross member having a first end attached to said first side member and a second end attached to said second side member.

7. The rotating wing for transporting an object of claim 1 wherein:
   a first counterweight is retained on one end of said first connecting rod to offset substantially half the weight of said wing frame; and
   a second counterweight is formed on one end of said second connecting rod to offset substantially half the weight of said wing frame.

8. A rotating wing for transporting an object, comprising:
   a support frame includes a first side frame, a second side frame and a cross member;
   a first connecting rod is rotatably retained on said first side frame;
   a second connecting rod is rotatably retained on said second side frame;
   a wing frame includes a first side, a second side and a wing surface, a first peripheral groove is formed in an outer surface of said first side, a second peripheral groove is formed in an outer surface of said second side;
   a first guide pin extends inward from said first side frame, said first guide pin engages said first peripheral groove, a second guide pin extends inward from said second side frame, said second guide pin engages said second peripheral groove; and
   at least one motor rotates at least one of said first and second connecting rods, wherein a rotating motion of said wing frame follows the shape of said first and second peripheral grooves.

9. The rotating wing for transporting an object of claim 8 wherein:
   said at least one motor is a first motor retained on said first side frame and a second motor retained on said second side frame, said first motor rotates said first connecting rod, said second motor rotates said second connecting rod.

10. The rotating wing for transporting an object of claim 8 wherein:
    said at least one motor is a doubled ended motor having a first drive shaft extending from a first end and a second motor extending from a second end, said doubled ended motor is retained inside said cross member.

11. The rotating wing for transporting an object of claim 10 wherein:
    a first drive pulley is attached to said first drive shaft, a second drive pulley is attached to said second drive shaft, said first drive pulley rotates said first connecting rod through a first driven pulley and a first drive belt, said second drive pulley rotates said second connecting rod through a second driven pulley and a second drive belt.

12. The rotating wing for transporting an object of claim 8 wherein:
    said peripheral groove has the shape of one of an oval and an hour glass.

13. The rotating wing for transporting an object of claim 8 wherein:
    at least one cross member having a first end attached to said first side member and a second end attached to said second side member.

14. The rotating wing for transporting an object of claim 8 wherein:
    a first counterweight is retained on one end of said first connecting rod to offset substantially half the weight of said wing frame; and
    a second counterweight is formed on one end of said second connecting rod to offset substantially half the weight of said wing frame.

15. A rotating wing for transporting an object, comprising:
    a support frame includes a first side frame, a second side frame and a cross member, one end of said first side frame is secured to a first end of said cross member, one end of said second side frame is secured to a second end of said cross member;
    a first connecting rod is rotatably retained on an opposing end of said first side frame;
    a second connecting rod is rotatably retained on an opposing end of said second side frame;
    a wing frame includes a first side member, a second side member and a wing cover, a first peripheral groove is formed in an outer surface of said first side member, a second peripheral groove is formed in an outer surface of said second side member;
    a first guide pin extends inward from said first side frame, said first guide pin engages said first peripheral groove, a second guide pin extends inward from said second side frame, said second guide pin engages said second peripheral groove; and
    at least one motor rotates at least one of said first and second connecting rods.

16. The rotating wing for transporting an object of claim 15 wherein:
    said at least one motor is a first motor retained on said first side frame and a second motor retained on said second side frame, said first motor rotates said first connecting rod, said second motor rotates said second connecting rod.

17. The rotating wing for transporting an object of claim 15 wherein:
    said at least one motor is a doubled ended motor having a first drive shaft extending from a first end and a second motor extending from a second end, said doubled ended motor is retained inside said cross member.

18. The rotating wing for transporting an object of claim 17 wherein:
    a first drive pulley is attached to said first drive shaft, a second drive pulley is attached to said second drive shaft, said first drive pulley rotates said first connecting rod through a first driven pulley and a first drive belt, said second drive pulley rotates said second connecting rod through a second driven pulley and a second drive belt.

19. The rotating wing for transporting an object of claim 15 wherein:
    said peripheral groove has the shape of one of an oval and an hour glass.

20. The rotating wing for transporting an object of claim 15 wherein:
    at least one cross member having a first end attached to said first side member and a second end attached to said second side member.

* * * * *